Oct. 20, 1925.

E. G. COOK 1,557,986

TIRE RIM TOOL

Filed Aug. 30, 1921

Inventor,
Edward G. Cook,

By

Attorney

Oct. 20, 1925.                                       1,557,986
E. G. COOK
TIRE RIM TOOL
Filed Aug. 30, 1921        3 Sheets-Sheet 2

Inventor,
Edward G. Cook,
By
Attorney

Oct. 20, 1925.
E. G. COOK
TIRE RIM TOOL
Filed Aug. 30, 1921
1,557,986
3 Sheets-Sheet 3
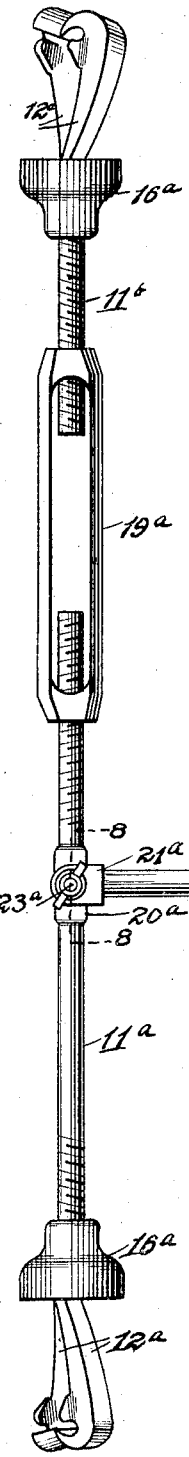
Fig. 5.
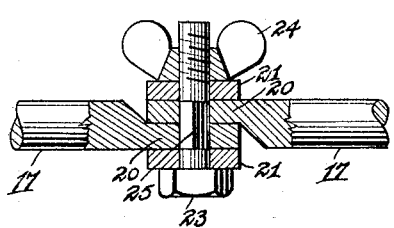
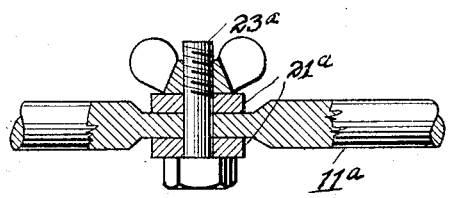
Fig. 8.
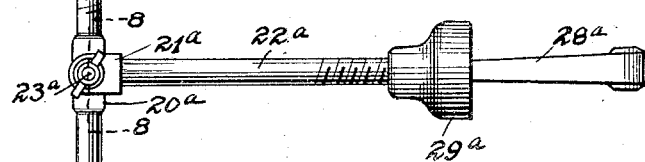
Fig. 7.
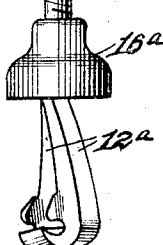
Edward G. Cook, Inventor
By B. H. Horter, Attorney Patented Oct. 20, 1925.

1,557,986

UNITED STATES PATENT OFFICE.

EDWARD G. COOK, OF WILMINGTON, DELAWARE, ASSIGNOR OF TWO-THIRDS TO RALPH L. REESE AND HENRY J. ELLIS, BOTH OF WILMINGTON, DELAWARE.

TIRE-RIM TOOL.

Application filed August 30, 1921. Serial No. 496,870.

*To all whom it may concern:*

Be it known that I, EDWARD G. COOK, a citizen of the United States, residing at Wilmington, in the county of New Castle and State of Delaware, have invented certain new and useful Improvements in Tire-Rim Tools, of which the following is a specification.

The present invention relates to devices for contracting and expanding split rims for automobile wheels. As is well known these rims, particularly of the heavier and larger sizes are very difficult to contract and expand in connection with the removal and replacement of tires.

The object is to provide an instrument of this character that can be applied to an ordinary rim without changing the latter and is so constructed that it will positively grip the rim and will not slip thereon.

A further and important object in this connection is the provision of a structure that can be engaged with the rim at points which will insure the contraction of the rim in a coiled condition, as distinguished from a mere bending action.

Two embodiments of the invention are illustrated in the accompanying drawings, wherein—

Fig. 5 is a sectional view taken on the line 5—5 of Fig. 4;

Fig. 7 is a view in elevation of a modified form of construction;

Fig. 8 is a detail sectional view on the line 8—8 of Fig. 7.

Figure 1:
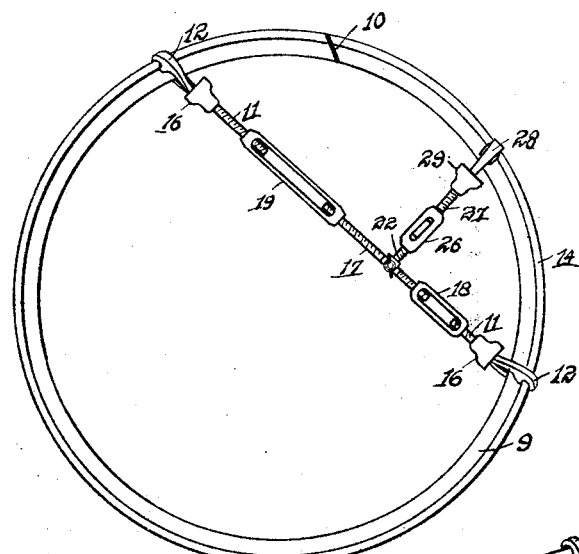
Figure 1 is a view of a split rim in its expanded operative condition with the tool in place thereon.
Figure 2:
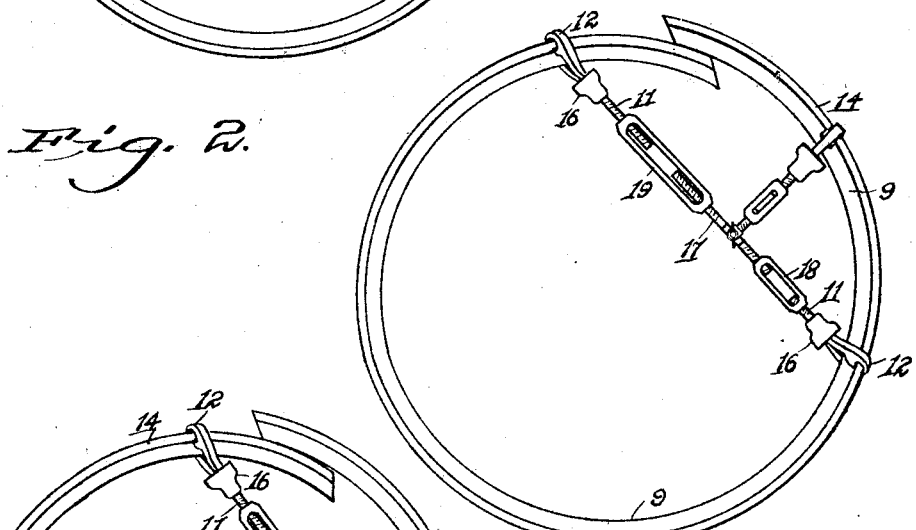
Fig. 2 is a similar view, but with the rim partly contracted.
Figure 3:
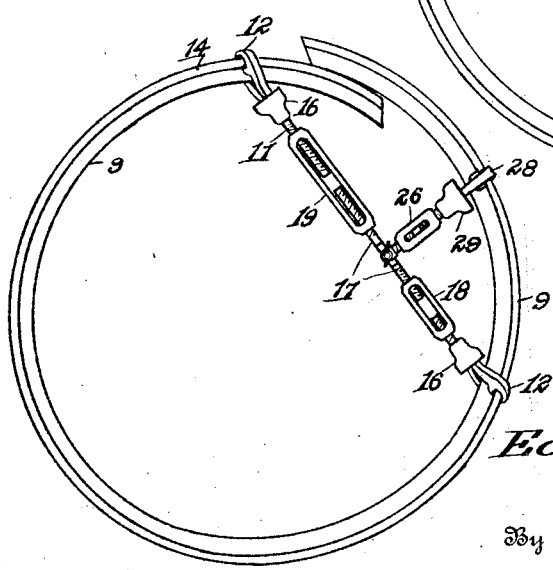
Fig. 3 is a view similar to Fig. 2, but with the rim in completely contracted condition.
Figure 6:
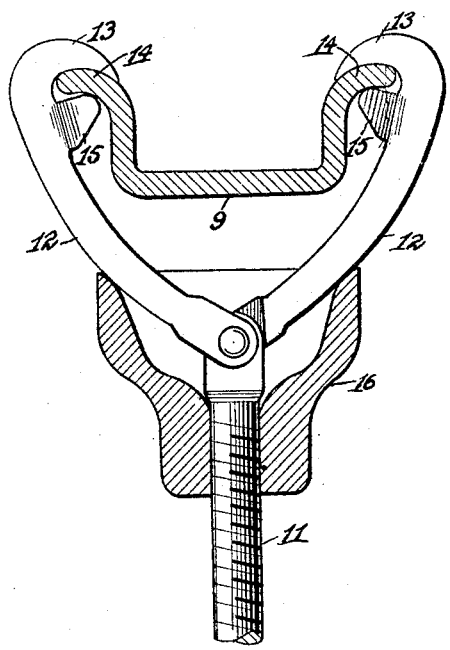
Fig. 6 is a detail sectional view on an enlarged scale illustrating one set of jaws and its clamping means, the jaws being engaged on the rim.
Figure 4:
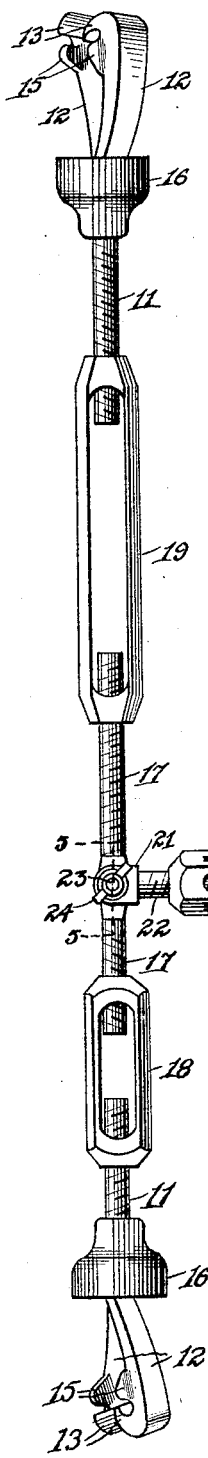
Fig. 4 is a view in elevation and on an enlarged scale of the tool.
Figure 4:
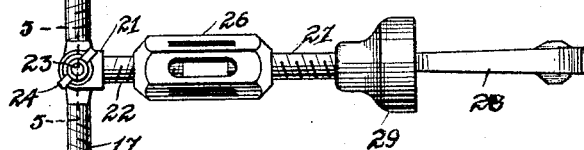
Figure 4:
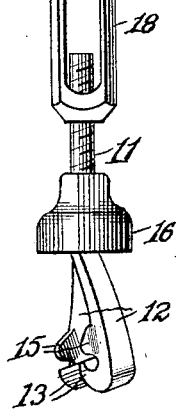

In the structure disclosed in Figs. 1–6, inclusive, the tire rim is indicated 9 and may be of any well-known character, having a split or cut 10 therethrough. A pair of threaded shanks 11 have pivoted to their outer ends sets of inwarding extending jaws 12. These jaws terminate at their free ends in in-turned, curved hooks or bills 13 that are adapted to engage over the outstanding margins 14 of the rim 9, as shown more particularly in Fig. 6. The jaws also have lugs 15 that engage the inner or under sides of the margins 14. Adjustably threaded on the shanks 11 are jaw-clamping bells 16 adapted to engage the shanks of the jaws when said bells are screwed outwardly and swing the jaws of each set inwardly into gripping engagement.

A threaded rod which may comprise sections 17 is connected to one of the shanks 11 by a turn-buckle 18 and to the other shank 11 by another turn-buckle 19. The rod sections 17 have flat, overlapping terminals 20, shown in Fig. 5, which are embraced by a yoke 21 formed upon one end of a screw-threaded rod 22, and the joint is connected by a bolt 23 having a thumb-nut 24 thereon, the said bolt passing through the eyes 20 and yoke 21 and having an angular portion 25 engaged in the eyes, thereby holding the rod sections 17 against pivotal movement. The rod 22 is engaged by a turn-buckle 26, that is engaged with another threaded rod 27, on which are mounted jaws 28 adapted to embrace the tire rim being clamped thereon by a bell 29 corresponding to the bells 16.

In using the device the jaws 12 are engaged on the rim on opposite sides of the split 10 and at different distances therefrom, the distance being varied slightly according to the diameter of the rim. In this connection it will be noted that the hooks 13 and lugs 15 are offset or tangentially arranged so that they will approximately fit the margins at the points of engagement. The bells are then run outwardly on the shanks and experience has proven that a gripping action can be secured which will positively not slip, this being moreover maintained by the brace 22—29, which is also engaged with the rim, as indicated in Fig. 1. When applied, as shown in Fig. 1, it is only necessary to operate the turn-buckle 19 in a direction to contract the coupling between the sets of jaws 12, whereupon the first action will be the disengagement of the abutting ends of the rim, and a continued movement will cause the inner end to slide within the outer end in a coiling action. A reverse movement of the turn-buckle will cause a positive extension of the coupling and by reason of the lugs 15 the rim will be positively expanded to its original or operative condition. The turnbuckles 18 and 26 are utilized merely for adjustment purposes in order that the tool may be employed on rims of different sizes.

For stock equipment the adjustments 18 and 26 may be dispensed with, as illustrated in Fig. 7. In the embodiment therein disclosed two shanks $11^a$ and $11^b$ are employed that are connected by the adjusting turnbuckle $19^a$. The outer ends of these shanks carry sets of jaws $12^a$ corresponding to the jaws 12 and adjusted and clamped by bells $16^a$ threaded on the shanks and engaging the jaws of the respective sets. The shank $11^a$ in this form of construction has a flat portion $20^a$ embraced by a yoke $21^a$ that is coupled thereto by a bolt $23^a$. The yoke $21^a$ forms part of a brace rod $22^a$ having pivoted thereto rim-engaging jaws $28^a$ that are gripped upon the rim by the bell $29^a$. It will be obvious that this structure operates in the same manner as the first embodiment and has all the advantages thereof with the exception of adjustability.

Having thus described my invention, what I claim as new and desire to secure by Letters Patent, is:

A rim tool comprising a pair of rods, a pair of clamping jaws at the end of each rod, means for forcing said jaws into engagement with the rim, a turnbuckle threaded on each rod, a coupling rod threaded into the turnbuckles, a brace attached at one end to the coupling rod and having jaws engaging the rim at the other end, and means for adjusting the effective length of the brace.

In testimony whereof I affix my signature.

EDWARD G. COOK.